US012730764B2

(12) United States Patent
Balakrishnan et al.

(10) Patent No.: US 12,730,764 B2
(45) Date of Patent: Sep. 8, 2026

(54) MULTIPLEXED BUS STREAK MANAGEMENT

(71) Applicant: Advanced Micro Devices, Inc., Santa Clara, CA (US)

(72) Inventors: Kedarnath Balakrishnan, Bangalore (IN); James R. Magro, Lakeway, TX (US)

(73) Assignee: Advanced Micro Devices, Inc., Santa Clara, CA (US)

(*) Notice: Subject to any disclaimer, the term of this patent is extended or adjusted under 35 U.S.C. 154(b) by 0 days.

(21) Appl. No.: 18/891,278

(22) Filed: Sep. 20, 2024

(65) Prior Publication Data

US 2025/0139022 A1 May 1, 2025

Related U.S. Application Data

(60) Provisional application No. 63/546,776, filed on Nov. 1, 2023.

(51) Int. Cl.
*G06F 13/16* (2006.01)
*G06F 13/40* (2006.01)

(52) U.S. Cl.
CPC ...... *G06F 13/1642* (2013.01); *G06F 13/1689* (2013.01); *G06F 13/4022* (2013.01)

(58) Field of Classification Search
CPC ............. G06F 13/1642; G06F 13/1689; G06F 13/4022
USPC .......................................................... 711/154
See application file for complete search history.

(56) References Cited

U.S. PATENT DOCUMENTS

| | | | | |
|---|---|---|---|---|
| 2009/0248994 | A1 | 10/2009 | Zheng et al. | |
| 2018/0018133 | A1* | 1/2018 | Balakrishnan | G06F 3/0611 |
| 2018/0018291 | A1* | 1/2018 | Magro | G06F 13/1689 |
| 2018/0019006 | A1 | 1/2018 | Brandl et al. | |
| 2019/0369917 | A1 | 12/2019 | Jin | |
| 2022/0229790 | A1* | 7/2022 | Nale | G06F 13/409 |
| 2022/0317923 | A1 | 10/2022 | Balakrishnan | |
| 2022/0317924 | A1* | 10/2022 | Shen | G06F 3/0679 |
| 2022/0317928 | A1 | 10/2022 | Shen et al. | |
| 2022/0413759 | A1 | 12/2022 | Shen et al. | |
| 2024/0053898 | A1* | 2/2024 | Zhang | G11C 7/109 |

OTHER PUBLICATIONS

International Search Report and Written Opinion for International Application No. PCT/US2024/053256 mailed Feb. 17, 2025, 7 pages.

* cited by examiner

*Primary Examiner* — Jared I Rutz
*Assistant Examiner* — Wei Ma
(74) *Attorney, Agent, or Firm* — Polansky & Associates, P.L.L.C.; Paul J. Polansky

(57) ABSTRACT

A memory controller includes a command queue stage for storing decoded memory access requests, a first arbiter operable to select first decoded memory access requests for a first pseudo channel from the command queue stage, and a second arbiter operable to select second decoded memory access requests for a second pseudo channel from the command queue stage. Each of the first arbiter and the second arbiter is operable to select a first streak of a first type of accesses, and to change to selecting a second streak of a second type of accesses in response to the first arbiter and the second arbiter meeting a cross mode condition.

20 Claims, 9 Drawing Sheets

MULTIPLEXED BUS STREAK MANAGEMENT

BACKGROUND

Modern dynamic random-access memory (DRAM) provides high memory bandwidth by increasing the speed of data transmission on the bus connecting the DRAM and one or more data processors, such as graphics processing units (GPUs), central processing units (CPUs), and the like. DRAM is typically inexpensive and high density, thereby enabling large amounts of DRAM to be integrated per device Most DRAM chips sold today are compatible with various double data rate (DDR) DRAM standards promulgated by the Joint Electron Devices Engineering Council (JEDEC). Typically, several DDR DRAM chips are combined onto a single printed circuit board substrate to form a memory module that can provide not only relatively high speed but also scalability. Higher processing speed and storage capabilities are especially useful in applications such as high-end servers for data centers, and new memory types that improve memory access speed at reasonable costs and memory controllers that can exploit their features are desirable. The multiplexed-rank dual inline memory module (MRDIMM) is a new type of memory module form factor useful for very high speed and performance applications such as servers for data centers. Current MRDIMMs use conventional double data rate, version five (DDR5) memory devices with specialty register clock driver (RCD) and data buffer (DB) chips while operating a very fast memory bus interface between the MRDIMM and the memory controller. MRDIMMs have two separate channels on the DIMM, known as pseudo channels, which are accessed from a shared high-speed memory bus between the MRDIMM and the memory controller. While the pseudo channels are mostly autonomous, they need to perform the same types of memory accesses, i.e., reads or writes, at the same time to avoid contention on the bus, making it difficult to design modular circuitry for each pseudo channel.

BRIEF DESCRIPTION OF THE DRAWINGS

FIG. 3 collectively illustrates a timing diagram useful in understanding the interface between the memory controller and MRDIMMs of FIGS. 1 and 2 according to some implementations, in which

Figure 1:
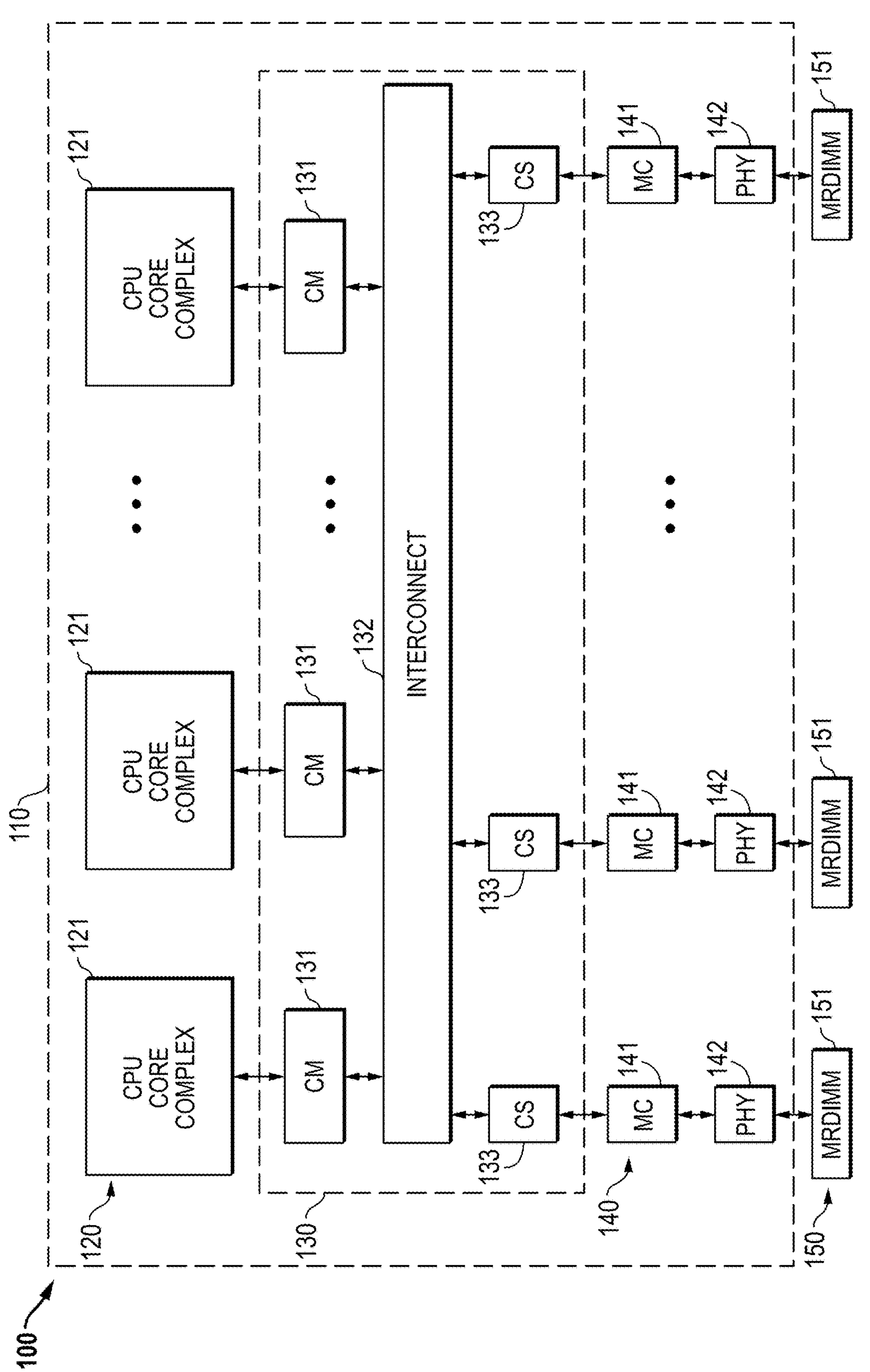
FIG. 1 illustrates in block diagram form a data processing system with a memory system according to some implementations.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate implementations using suitable forms of indirect electrical connection as well. The following Detailed Description is directed to electronic circuitry, and the description of a block shown in a drawing figure implies the implementation of the described function using suitable electronic circuitry, unless otherwise noted.

DETAILED DESCRIPTION OF ILLUSTRATIVE IMPLEMENTATIONS

MRDIMM systems support a high-speed form factor that uses a common bus conveying time-multiplexed signals for two pseudo channels at very high bus speeds. The two pseudo channels are mostly independent, but are constrained by the need to operate in the same mode, either read mode or write mode, at the same time to avoid bus contention. According to the disclosed implementations, existing memory controller arbitration circuitry can be modular and re-used by ensuring that the arbitration circuitry for the pseudo channels meets a cross mode condition, in which the cross mode condition is a condition in which the arbitration circuitry is ready to switch from a current mode (e.g., read or write) to the cross mode (e.g., write or read, respectively). In one implementation, the cross mode condition is based on a total number of the second type of commands (i.e., the cross mode commands) for both the first pseudo channel and the second pseudo channel in the command queue stage. This implementation causes the arbiters to independently make the same cross mode decision based on the memory access requests for the whole system at about the same time, with the arbiters requiring only a small increase in circuit area. In another implementation, the cross mode condition is based on a number of the second type of commands for a respective pseudo channel in the command queue stage and an indication that the other arbiter is also ready to switch to the cross mode. This implementation leverages the assumption that the ratio of reads to writes for workloads in each pseudo channel will generally be about the same, and it allows the re-use of existing arbiter circuits with only very slight modifications to ensure proper handshaking.

A memory controller includes a command queue stage for storing decoded memory access requests, a first arbiter operable to select first decoded memory access requests for a first pseudo channel from the command queue stage, and a second arbiter operable to select second decoded memory access requests for a second pseudo channel from the command queue stage. Each of the first arbiter and the second arbiter is operable to select a first streak of a first type of accesses, and to change to selecting a second streak of a second type of accesses in response to both the first arbiter and the second arbiter meeting a cross mode condition.

A data processing system includes a plurality of data processor cores each of which is operable to generate memory access requests, a memory having a first pseudo channel and a second pseudo channel, and a memory controller. The memory controller is operable to receive the memory access requests from the plurality of data processor cores and provide memory commands to the memory. The memory controller includes a first arbiter and a second arbiter each operable to select a first streak of a first type of accesses, and to change to selecting a second streak of a second type of accesses in response to the first arbiter and the second arbiter meeting a cross mode condition.

A method for accessing a memory includes storing memory access requests in a command queue stage, wherein each memory access request accesses one of a first pseudo channel and a second pseudo channel of the memory. An arbitration stage arbitrates among the memory access requests to obtain first arbitration winners for the first pseudo channel using a first arbiter and the second pseudo channel using a second arbiter. A first streak of a first type of accesses is selected by the first arbiter. The method changes to selecting a second streak of a second type of accesses in response to the first arbiter and the second arbiter meeting a cross mode condition.

FIG. 1 illustrates in block diagram form a data processing system 100 with a memory system 150 according to some implementations. Data processing system 100 includes generally a data processor 110 and memory system 150.

Data processor 110 includes a set of CPU core complexes 120, a data fabric 130, and a set of memory access circuits 140. CPU core complexes 120 include a representative set of three CPU core complexes 121 including a first CPU core complex, a second CPU core complex, and a third CPU core complex. In various implementations, the CPU core complexes could include other types of data processing cores, including graphics processing unit (GPU) cores, digital signal processing (DSP) cores, single-instruction, multiple data (SIMD) cores, neural processor cores, and the like. Each CPU core complex 121 has a downstream bidirectional port for communicating with memory and peripherals (not shown) through a data fabric 130 in response program threads implemented by stored program instructions.

Data fabric 130 includes a set of upstream ports known as coherent master ports 131 labelled "CM" and a set of downstream ports known as coherent slave ports 133 labelled "CS" interconnected with each other through an interconnect 132. As used herein, "upstream" means in a direction toward CPU core complexes 120 and away from memory system 150. Each coherent master port 131 has an upstream bidirectional bus connected to a respective one of CPU core complexes 121, and a downstream bidirectional bus connected to interconnect 132. Crossbar switch is a large interconnect that selectively routes accesses between CPU core complexes 121 and memory system 150. Each coherent slave port 133 has an upstream bidirectional port connected to interconnect 132, and a downstream bidirectional port connected to a corresponding one of memory controllers 141.

Each memory access circuit 140 includes a memory controller 141 labelled "MC" and a physical interface circuit 142 labelled "PHY". Each memory controller 141 has a bidirectional upstream port connected to a downstream port of a respective one of coherent slave ports 133, and a bidirectional downstream port. Each physical interface circuit 142 has a bidirectional upstream port connected to a bidirectional downstream port of a respective memory channel controller, and a bidirectional downstream port connected to memory system 150.

Memory system 150 includes a set of multiplexed rank dual inline memory modules (MRDIMMs) 151 each having a bidirectional upstream port connected to downstream bidirectional port of a respective one of physical interface circuits 142.

Data processing system 100 is a high-performance data processing system such as a server processor for a data center. It supports a high memory bandwidth by providing a large memory space using multiple memory channels accessible by each of a set of processor cores in each of several CPU core complexes.

According to various implementations disclosed herein, each memory access circuit 140 implements a virtual controller (VC) mode for the MRDIMM memory type. The MRDIMM implements two channels, known as "pseudo channels", on the DIMM that are accessed using a very high-speed interface between the memory controller and the MRDIMM. Instead of duplicating memory controller circuitry to access each pseudo channel, the memory controller advantageously shares certain resources among the pseudo channels to significantly reduce chip cost with only a very small impact on performance.

MRDIMM is a new, emerging memory standard that leverages the high bus speed of double data rate, version five (DDR5) memory to provide the high bandwidth supported. By implementing the virtual controller mode, data processor 110 can support both pseudo channels with less extra circuitry beyond a non-MRDIMM system. Relevant aspects of the MRDIMM architecture will now be described.

Figure 2:
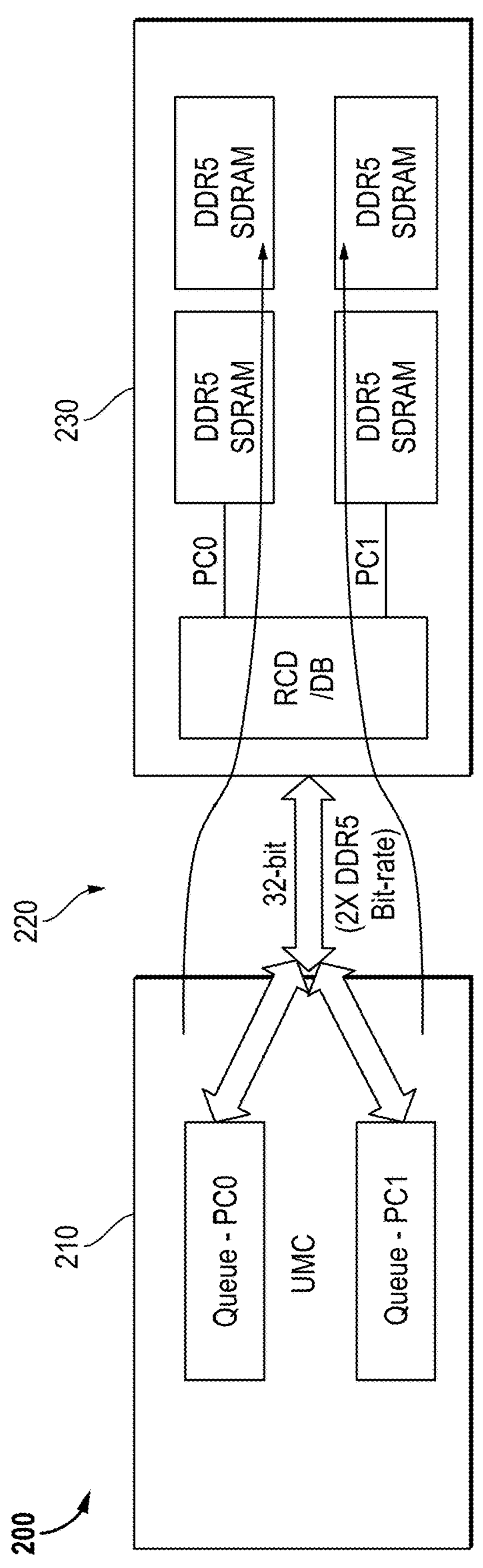
FIG. 2 illustrates in block diagram form a memory access architecture for use with the MRDIMMs of FIG. 1 according to some implementations.

FIG. 2 illustrates in block diagram form a memory accessing architecture 200 suitable for use with MRDIMMs 151 of FIG. 1 according to some implementations. Memory accessing architecture 200 includes a memory controller 210 labelled "UMC", a memory bus 220, and an MRDIMM 230. Internally, memory controller 210 maintains two queues for storing accesses for each respective pseudo channel, labelled "Queue—PC0" and "Queue—PC1", in which "PC0" corresponds to pseudo channel 0 and "PC1" corresponds to pseudo channel 1, as well as other circuitry not shown in FIG. 2.

According to the MRDIMM configuration, memory command and response signals for both PC0 and PC1 are transmitted to MRDIMM 230 using a single interface that operates at twice the rate of memory controller 210 and of MRDIMM 230. The individual memory chips on the MRDIMM operate according to the DDR5 standard. The DDR5 standard provides various speed enhancements such as decision feedback equalization (DFE) on receivers that provide very reliable operation at high clock speeds Because DDR5 is standardized, it is expected to provide very high performance at reasonably low prices. In other implementations, other current and future memory types that are relatively high speed, standardized memories can be used in place of DDR5 memory.

MRDIMM 230 includes a register clock driver and data buffer block labelled "RCD/DB" that may be implemented with separate chips, a first channel corresponding to PC0 having two ranks of DDR5 memory chips, and a second channel corresponding to PC1 also having two ranks of DDR5 memory chips. The RCD/DB block separates the memory accesses for PC0 from the memory accesses for PC1 and routes them to the corresponding pseudo channel on MRDIMM 230, as shown by the two thin arrows in FIG. 2.

Several features of memory accessing architecture 200 and memory controller 210 cooperate to provide high performance and/or low cost. First, MRDIMM 230 uses memory chips operating according to the JEDEC DDR5 specification. Since they are commodity memory chips operating according to a public standard, they will keep system cost low for the level of performance offered.

Second, memory bus 220 uses the well-known DDR5 memory interface that is capable of operating at very high speeds. For example, DDR5 receivers use decision feedback equalization (DFE) for improved reliability and low bit error rates while operating at very high speeds.

Third, MRDIMM 230 moves the virtualization point of the two pseudo channels to RCD/DB 231, such that a single physical channel—memory bus 220—exists between memory controller 210 and MRDIMM 230. MRDIMM 230, however, supports two pseudo channels, i.e., virtual channels, on MRDIMM 230.

Fourth, as will now be described, memory controller 210 has a virtual controller mode (VCM) in which some memory controller hardware is shared between the PC0 and PC1 sub-channels. The manner in which memory controller 210 implements VCM will now be described.

Figure 3A:
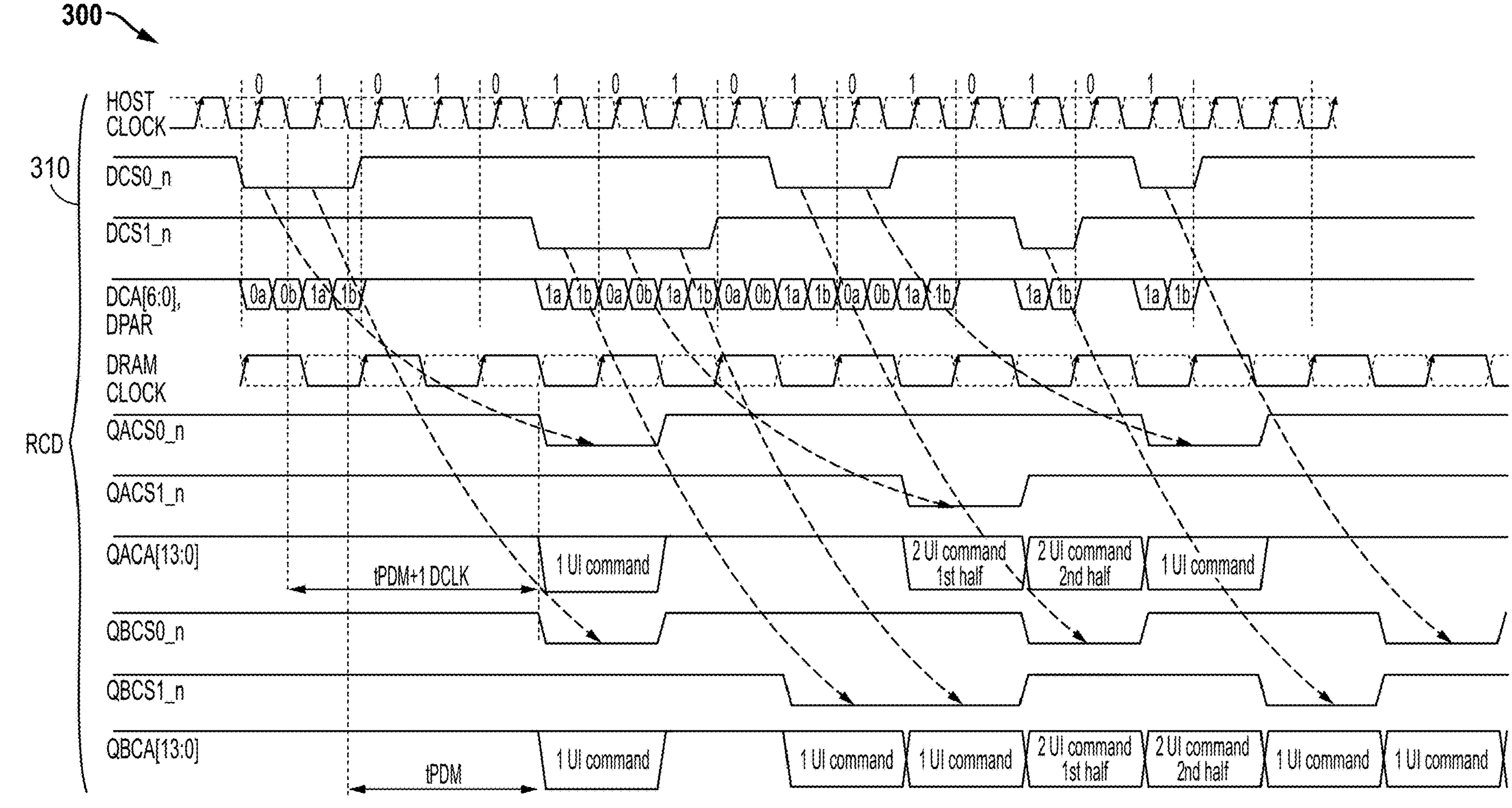
FIG. 3A is a first portion of the timing diagram showing a set of RCD signals transmitted between the physical interface circuit of FIG. 1 and the memories on the MRDIMM using the RCD of FIG. 2.
Figure 3B:
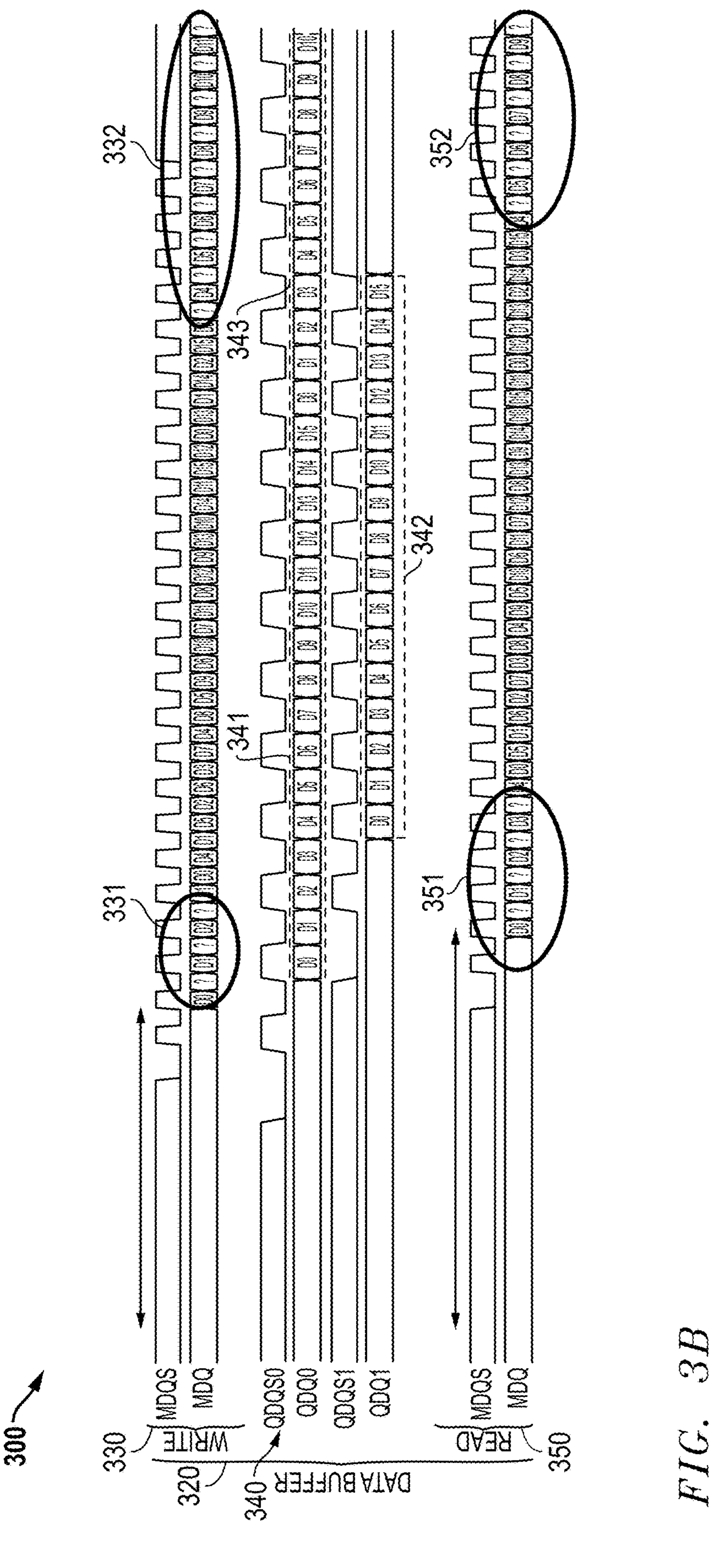
FIG. 3B is a second portion of the timing diagram showing a set of DB signals transmitted between the physical interface circuit of FIG. 1 and the memories on the MRDIMM using the DB of FIG. 2.

FIG. 3 collectively illustrates a timing diagram 300 useful in understanding the interface between the memory controller and MRDIMMs of FIGS. 1 and 2 according to some implementations, in which FIG. 3A is a first portion of timing diagram 300 showing a set of RCD signals 310 transmitted between physical interface circuit 142 of FIG. 1 and the memories on the MRDIMM using the RCD of FIG. 2, and FIG. 3B is a second portion of timing diagram 300 showing a set of DB signals transmitted between the physical interface circuit of FIG. 1 and the memories on the MRDIMM using the DB of FIG. 2. Both RCD signals 310 and DB signals 320 illustrate a multiplexed mode of operation.

In FIG. 3A, the horizontal axis represents time in picoseconds (ps), and the vertical axis represents the states of various signals. RCD signals 310 include a first sub-group of signals transmitted between the physical interface circuit and the RCD, and a second sub-group of signals transmitted between the RCD and the memory chips. The first sub-group of signals includes a host clock signal labelled "HOST CLOCK", a chip select signal labelled "DCS0_n" that selects memory chips on Rank 0 of a channel n, a chip select signal labelled "DCS1" that selects memory chips on Rank 1 of channel n, and command and address signals collectively labelled "DCA [6:0]", along with a parity signal labelled "DPAR". The RCD receives and buffers these multiplexed command and address signals and distributes them to the DRAM chips on the selected one of PC0 and PC1. It outputs a memory clock signal labelled "DRAM CLOCK", a chip select signal labelled "QACS0_n" for Rank 0 of PC0, a chip select signal labelled "QACS1_n" for Rank 1 of PC1, and a command and address signal for Rank 0 both PC0 and PC1 labelled "QACA[13:0]". The DRAM CLOCK signal operates at half the rate of the HOST CLOCK signal, but the RCD separates the commands for PC0 and PC1 and provides them to their respective buses. In timing diagram 300, the commands are either read or write commands, but both pseudo channels operate using the same type of commands at the same time, either read or write, to avoid contention on the data bus.

As shown in timing diagram 300, the DCA[6:0] signals conduct a command for Rank 0 of PC0 followed by a command for Rank 0 of PC1, including four consecutive command and address portions transmitted on four consecutive edges of the higher speed HOST CLOCK signal from the physical interface circuit to the RCD, labelled "0a", "0b", "1a", and "1b", respectively. The RCD combines these signals into corresponding commands on the PC0 and PC1 buses formed by two command and address portions transmitted on two consecutive rising edges of the lower speed DRAM CLOCK signal transmitted by the RCD to the memory chips. Thus, a first command for Rank 0 of PC0 is transmitted from the PHY to the RCD during the even or "0" HOST CLOCK cycle, including two command and address portions labelled "0a" and "0b". The active state of the DCS0_n signal during the even clock cycle causes the activation of the RCD output signal QACS0_n at a time period of $t_{PDM}$+1 DCLK after the second command and address unit 0b is received by the RCD. The RCD transmits the concatenated 14-bit command on the QACA[13:0] signals for Rank 0 of PC0 and selects it by activating chip select signal QACS0_n. The command lasts for a complete cycle of the DRAM CLOCK signal and is thus a one-unit interval (1 UI) command. Correspondingly, a second command for Rank 0 of PC1 is transmitted from the PHY to the RCD during the odd or "1" HOST CLOCK cycle, including two command and address portions labelled "1a" and "1b". The active state of the DCS0_n signal during the odd clock cycle causes the activation of the RCD output signal QBCS0_n a time $t_{PDM}$ after the second command and address unit 1b is received by the RCD. The RCD activates the concatenated 14-bit command on the QBCA[13:0] signals for Rank 0 of PC1 and selects it by activating chip select signal QBCS0_n.

Subsequently, a third command for Rank 1 of PC1 is transmitted from the PHY to the RCD during the odd or "1" HOST CLOCK cycle, including two command and address portions 1a and 1b. The active state of the DCS1_n signal during the odd clock cycle causes the activation of the RCD output signal QBCS1_n. The RCD activates the concatenated 14-bit command on the QBCA[13:0] signals for Rank 1, selected by an active state of chip select signal QCS1_n. A fourth command for Rank 1 of PC0 is transmitted from the PHY to the RCD during the next even HOST CLOCK cycle, including two command and address portions 0a and 0b. The continued active state of the DCS1_n signal during the even clock cycle causes the activation of the RCD output signal QACS1_n. In the example shown, Rank 1 of PC0 receives a 2 UI command in which the second portion is subsequently received to provide a continuous command stream on Rank 1 of PC0. A fifth command for Rank 1 of PC1 is transmitted from the PHY to the RCD during the next odd HOST CLOCK cycle, including two command and address portions 1a and 1b. The continued active state of the DCS1_n signal during the odd clock cycle causes the activation of the RCD output signal QBCS1_n. In the example shown, Rank 1 of PC1 receives two 1 UI commands to provide a continuous command stream on Rank 1 of PC0. The RCD activates the concatenated 14-bit command on the QBCA[13:0] signals for PC1, selected by an active state of chip select signal QBCS0_n. This pattern continues for different combinations of cycles as shown in FIG. 3A.

Thus, the PHY and RCD are able to support a dual-rank mode per pseudo channel by multiplexing the command and address signals on the higher speed PHY-to-RCD interface, while using the even and odd HOST CLOCK cycles to multiplex command and address and chip select signals onto the desired pseudo channel.

In FIG. 3B, DB signals 320 include a write signal group 330, a common signal group 340, and a read signal group 350. Write signal group 330 includes a strobe signal MDQS and a corresponding data signal MDQ output from the physical interface circuit to the DB on the memory bus. Common signal group 340 includes a strobe signal QDQS0 and data input/output signals QDQ0 for PC0, and a strobe signal QDQS1 and data input/output signals QDQ1 for PC1. Read signal group 350 includes a strobe signal MDQS and a corresponding data signal MDQ provided as an output from the DB to the PHY for PC1. The data for both PC0 and PC1 is time-division multiplexed on the memory bus during both write and read cycles, but conducted separately between the DB and the memory chips at a slower rate. Timing diagram 300 shows that very high efficiency at up to twice the maximum clock speed of the DRAM chips can be achieved if there is continuous traffic for both PC0 and PC1. Timing diagram 300 shows periods in which only one pseudo channel is used, i.e., during periods 331 and 332 for write cycles and periods 351 and 352 for read cycles periods, but also periods of continuous data bus utilization between them.

As shown in timing diagram 300, a command causes the memory chips on the PC0 bus to conduct a burst of length 16 containing data elements D0 through D15 that are provided on consecutive edges of the QDQS0 strobe signal on the PC0 bus. For a write cycle, data elements DQ0 through DQ15 are received on alternating edges of the higher speed MDQS strobe signal on the memory bus and driven for longer periods of time on the PC0 bus based on alternating edges of the QDQS strobe signal. This pattern is repeated for a subsequent command and results in continuous data being driven on the PC0 bus as long as the delay from the first command to the subsequent command is equal to the minimum command-to-command delay time shown by the two horizontal arrows in timing diagram 300. Timing diagram 300 shows an example in which a command for PC1 is received by the RCD immediately after command and results in a data burst on the QDQ1 bus.

Correspondingly, during a read cycle, commands are driven from the physical interface circuit to the RCD in a similar fashion, but for a read cycle data is provided by the memory chips to the memory controller a delay period after the read commands. The DB time-division multiplexes alternating read data from PC0 and PC1 and provides the read data on the MDQ bus to the physical interface circuit on alternative edges of the higher speed MDQS signal.

The overall bus utilization depends on the timing of the issuance of commands, but if commands are not available, the utilization of the memory bus will be reduced from the peak rate of 100% to lower rates determined by periods of isolated commands. In the example of timing diagram 300, the memory data bus is under-utilized during a write cycle during two periods 331 and 332, which corresponds to periods of consecutive commands on PC0 but only an isolated command on PC1. Likewise, the memory data bus is under-utilized during a read cycle during two periods 351 and 352, which corresponds to periods of consecutive commands on PC0 but only an isolated command on PC1. Conversely, however, the overall utilization of the memory bus can approach 100% during periods of consecutive commands with minimum command-to-command spacing with a bandwidth of twice that of a conventional DIMM. Moreover, this technique can be accomplished using DRAM chips that only operate at a slower speed, as long as data can be transferred on the memory bus at the higher speed. In the example shown in timing diagram 300, the higher speed is twice the lower speed.

In general, the RCD and DB can support multiple different modes for mapping the commands from the processor to the pseudo channels on the MRDIMMs. Timing diagram 300 shows one exemplary mode in which each DCS signal and corresponding command maps to a different pseudo channel. In another example, a single DCS signal can map to two pseudo channels in which commands are sent to the RCD on alternative even and odd unit intervals.

According to various implementations described herein, the data processing system has a virtual controller mode, known as MR-VCM, in which various memory controller resources are shared between the pseudo channels. Using MR-VCM, the memory controller allows a nearly independent selection of commands between each pseudo channel, subject only to the limitation of operating the memory data bus in the same direction, either read or write, at the same time. Two exemplary implementations of memory controllers using MR-VCM will now be described.

Figure 4:
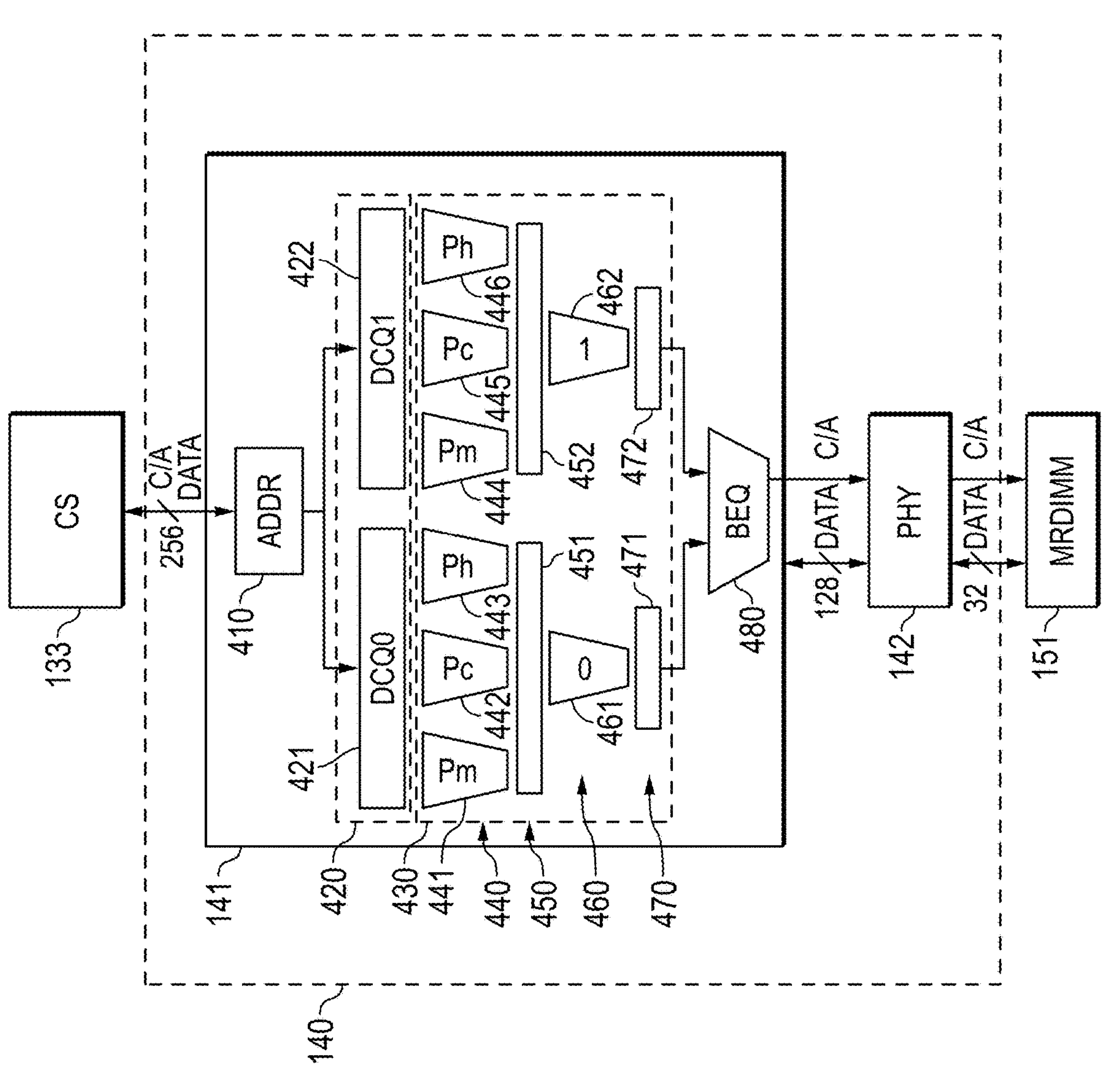
FIG. 4 illustrates in block diagram form a memory controller with an MRDIMM virtual controller mode according to some implementations.

FIG. 4 illustrates a block diagram of a portion of a data processing system 400 including a memory access circuit 140 with an MRDIMM virtual controller mode according to some implementations. Data processing system 400 includes part of a data processor and MRDIMM 151. Data processing system 400 includes a coherent slave port 133, a memory access circuit 140, and an MRDIMM 151.

Memory access circuit 140 includes memory controller 141 and physical interface circuit 142. Memory controller 141 is bidirectionally connected to coherent slave port 133. In the example shown in FIG. 4, coherent slave port 133 supports 256-bit data transfers. Coherent slave port 133 also provides command and address (C/A) signals that indicate the type of access, either read or write, and the address of the access.

Memory controller 141 includes an address decoder 410, a command queue stage 420, an arbiter 430, and a dispatch queue 480 labelled "BEQ" Address decoder 410 has an upstream port connected to coherent slave port 133 for receiving memory access requests and providing memory access responses, and a downstream port. Address decoder 410 decodes and maps addresses of memory access requests to addresses of memory in MRDIMM 151. When the addresses are decoded, the memory accesses requests are assigned to either PC0 or PC1 by decoding one or more bits of the addresses received from coherent slave port 133.

Command queue stage 420 includes a command queue 421 for PC0 labelled "DCQ0", and a command queue 422 for PC1 labelled "DCQ1". Command queue 421 has an upstream port connected to the downstream port of address decoder 410, and stores accesses to PC0 that are awaiting arbitration. Command queue 422 has an upstream port connected to the downstream port of address decoder 410, and stores accesses to PC1 that are awaiting arbitration. Accesses that are stored in command queue stage 420 can be issued to the memory in a different order to promote efficiency in usage of the DRAM bus, while maintaining fairness of all accesses so they make progress toward completion.

In data processing system 400, arbiter 430 includes separate arbitration circuitry for each pseudo channel organized into a sub-arbitration stage 440, a register stage 450, a final arbitration stage 460, and a register stage 470.

Sub-arbitration stage 440 includes a page miss sub-arbiter 441 labelled "Pm" for PC0 connected to command queue 421 for arbitrating among memory access requests to closed pages, a page conflict sub-arbiter 442 labelled "Pc" for PC0 connected to command queue 421 for arbitrating among memory access requests to closed pages when another page in the accessed memory bank is open, and a page hit sub-arbiter 443 labelled "Ph" for PC0 connected to command queue 421 for arbitrating among memory access requests to open pages in the accessed bank. Sub-arbitration stage 440 also includes a page miss sub-arbiter 444 labelled "Pm" for PC1 connected to command queue 422 for arbitrating among memory access requests to closed pages, a page conflict sub-arbiter 445 labelled "Pc" for PC1 connected to command queue 422 for arbitrating among memory access requests to closed pages when another page in the accessed memory bank is open, and a page hit sub-arbiter 446 labelled "Ph" for PC1 having an upstream port connected to command queue 422 that arbitrates among memory access requests to open pages in the accessed bank.

Register stage 450 includes a register 451 for PC0 and a register 452 for PC1. Register 451 is connected to outputs of each sub-arbiter for PC0 including page miss sub-arbiter 441, page conflict sub-arbiter 442, and page hit sub-arbiter 443, and stores sub-arbitration winners from each of page miss sub-arbiter 441, page conflict sub-arbiter 442, and page hit sub-arbiter 443 during a command arbitration cycle. Register 452 is connected to the outputs of each sub-arbiter for PC1 including page miss sub-arbiter 444, page conflict sub-arbiter 445, and page hit sub-arbiter 446, and stores sub-arbitration winners from each of page miss sub-arbiter 441, page conflict sub-arbiter 442, and page hit sub-arbiter 443 during a command arbitration cycle.

Final arbitration stage 460 selects between the sub-arbitration winners to provide a final arbitration winner for each of PC0 and PC1. Final arbitration stage 460 includes a final arbiter 461 labelled "0" for PC0 and a final arbiter 462 labelled "1" for PC1. Final arbiter 461 is connected to register 451 and selects from among the three sub-arbitration winners for PC0 to provide a final arbitration winner in each controller cycle to a downstream port. Likewise, final arbiter 462 is connected to register 452 and selects from among the three sub-arbitration winners for PC1 to provide a final arbitration winner in each controller cycle to a downstream port. For each final arbiter, the different types of accesses from the sub-arbitration winners can be advantageously mixed so that, for example, a page hit access can be followed by a page miss access or a page conflict access to hide or partially hide the overhead of opening a new page or closing an open page and opening a new page, respectively.

A register stage 470 stores the final arbitration winner for each pseudo channel, and includes a register 471 connected to the downstream port of final arbiter 461, and a register 472 connected to the output of final arbiter 462. In some implementations, two final arbitration winners, one from each of PC0 and PC1, can be selected during each memory controller cycle.

A dispatch queue 480 (BEQ) interleaves the accesses from the two pseudo channels into a single command and address stream with accompanying data (for a write cycle) or while receiving data (for a write cycle) as described with respect to FIG. 3 above.

A bus known as the DDR-to-PHY (DFI) Interface is used to communicate signals between memory controller 141 and physical interface circuit 142. The DFI Interface is an industry-defined specification that allows interoperability among various memory controller and PHY designs, which are typically made by different companies. It is expected that the signal timings discussed herein will be adopted as a part of future versions of the DFI protocol to support MRDIMMs.

Physical interface circuit 142 communicates with MRDIMM 151 over a memory bus that operates at very high speed and bandwidth. In various implementations, the memory bus is expected to operate at twice the speed of the DFI bus. Since it transfers data on each half cycle of the clock signal, it can perform four 32-bit in the same amount of time that the DFI bus performs one 128-bit transfer of data.

According to the MRDIMM technique, consecutive commands can be issued to alternate pseudo channels on the MRDIMM while the data of PC0 and PC1 is interleaved on the memory bus. During write cycles, data from the memory access requests for the two pseudo channels can then be separated by the data buffer on the MRDIMM and synchronized using the RCD on the MRDIMM so that accesses to the memories on the two pseudo channels on the DIMM can take place substantially in parallel. During read cycles, data from the memory access requests for the two pseudo channels is combined by the data buffer on the MRDIMM and synchronized using the RCD on the MRDIMM, and transferred to the data processor over the memory bus. For both read and write cycles, accesses to the memories on the two pseudo channels on the DIMM can take place substantially in parallel. Thus, the MRDIMM technique leverages the high speed operating capability of the DDR5 bus to almost double the effective memory bandwidth.

A single command and address stream is provided to physical interface circuit 142. In the illustrated example, physical interface circuit 142 operates at twice the speed of memory controller 141 and of the pseudo-channel buses on MRDIMM 230. Thus, for every 256-bit data access received from coherent slave port 133, memory controller 141 issues two 128-bit accesses and transfers data at twice the speed over the data bus. The memory chips connected to PC0 and PC1 operate at half the overall rate as well.

Data processing system 400 shares the following circuit elements between PC0 and PC1: address decoder 431, dispatch queue 480, and physical interface circuit 142. In this implementation, the command queues, sub-arbiters, and final arbiters are dedicated to their respective pseudo channels. As will now be described, more resources of the memory controller can be shared between the pseudo channels to further reduce chip area and cost.

Figure 5:
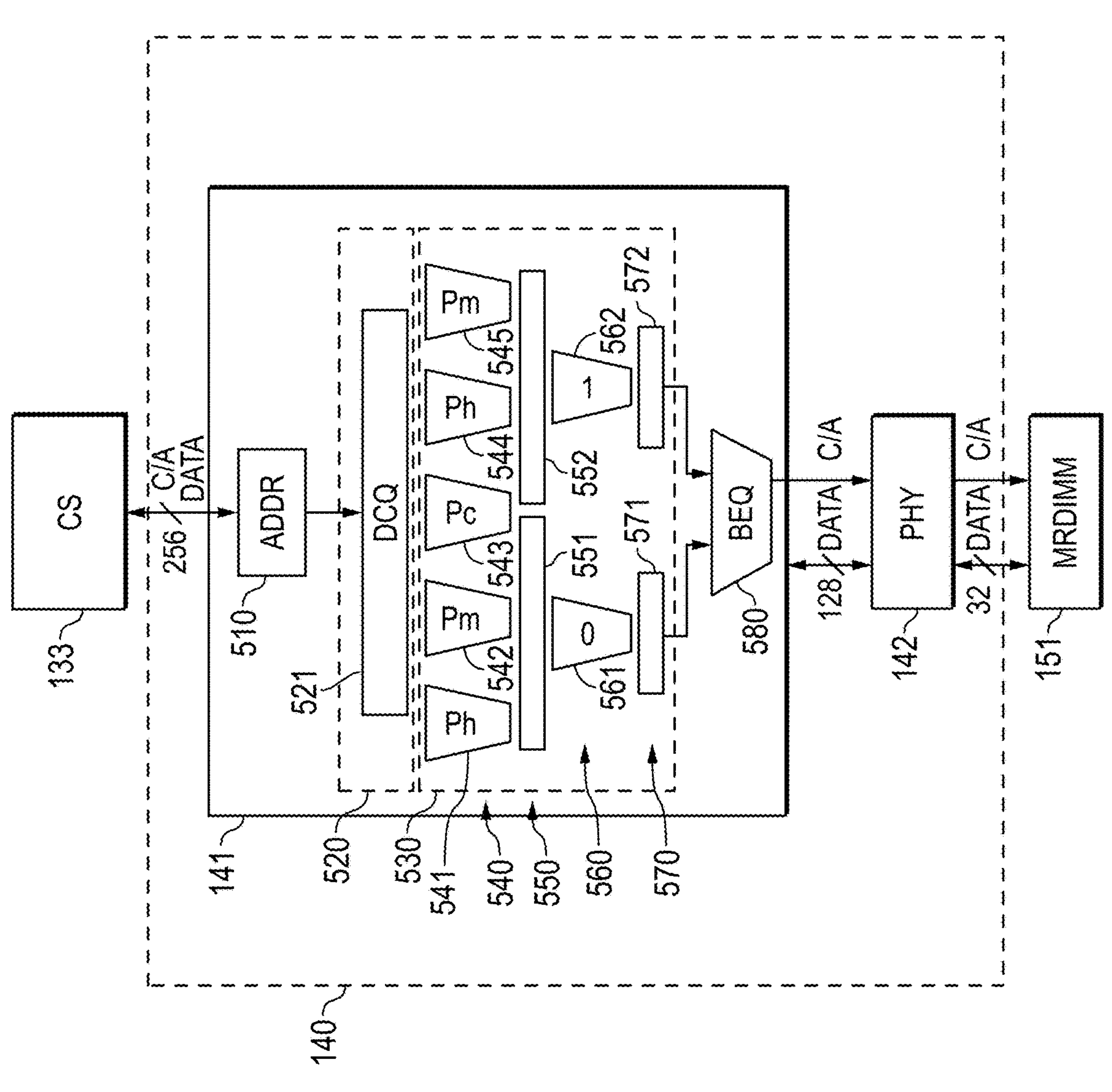
FIG. 5 illustrates a block diagram of a memory controller with a MRDIMM virtual controller mode according to other implementations.

FIG. 5 illustrates a block diagram of a portion of a data processing system 500 including a memory access circuit 140 with an MRDIMM virtual controller mode according to some implementations. Data processing system 500 includes part of a data processor and MRDIMM 151. Data processing system 400 includes a coherent slave port 133, a memory access circuit 140, and an MRDIMM 151.

Memory access circuit 140 includes memory controller 141 and physical interface circuit 142. Memory controller 141 is bidirectionally connected to coherent slave port 133. In the example shown in FIG. 5, coherent slave port 133 supports 256-bit data transfers. Coherent slave port 133 also provides command and address (C/A) signals that indicate the type of access, either read or write, and the address of the access.

Memory controller 141 includes an address decoder 510, a command queue stage 520, an arbitration stage 530, and a dispatch queue 580 labelled "BEQ" Address decoder 510 has an upstream port connected to coherent slave port 133 for receiving memory access requests and providing memory access responses, and a downstream port. Address decoder 510 decodes and maps addresses of memory access requests to addresses of memory in MRDIMM 151. When the addresses are decoded, the memory accesses requests are assigned to either PC0 or PC1 by decoding one or more bits of the addresses received from coherent slave port 133.

Command queue stage 520 includes a single command queue 521 for both PC0 and PC1 labelled "DCQ" Command queue 521 has an upstream port connected to the downstream port of address decoder 510, and stores accesses to both PC0 and PC1 that are awaiting arbitration Accesses that are stored in command queue 521 can be issued to the memory in a different order to promote efficiency in usage of the DRAM bus, while maintaining fairness of all accesses so they make progress toward completion.

In data processing system 500, arbitration stage 530 includes separate arbitration circuitry for each pseudo channel organized into a sub-arbitration stage 540, a register stage 550, a final arbitration stage 560, and a register stage 570.

Sub-arbitration stage 540 includes a page hit sub-arbiter 541 (Ph) for PC0 connected to command queue 521 for arbitrating among memory access requests to open pages in the accessed bank, and a page miss sub-arbiter 542 (Pm) for PC0 connected to command queue 521 for arbitrating among memory access requests to closed pages. Sub-arbitration stage 540 also includes a page hit sub-arbiter 446 (Ph) for PC1 having an upstream port connected to command queue 521 that arbitrates among memory access requests to open pages in the accessed bank, and a page miss sub-arbiter 545 (Pm) for PC1 connected to command queue 521 for arbitrating among memory access requests to closed pages. Finally, sub-arbitration stage 540 includes a page conflict sub-arbiter 442 (Pc) for both PC0 and PC1 connected to command queue 521 for arbitrating among memory access requests to closed pages when another page in the accessed memory bank is open.

Register stage 550 includes a register 551 for PC0 and a register 552 for PC1. Register 551 is connected to outputs of each sub-arbiter for PC0 including page hit sub-arbiter 541 and page miss sub-arbiter 542, as well as to page conflict sub-arbiter 543, and stores sub-arbitration winners from each of them during a command arbitration cycle. Register 452 is connected to outputs of each sub-arbiter for PC1 including page hit sub-arbiter 544 and page miss sub-arbiter 545, as well as to page conflict sub-arbiter 543, and stores sub-arbitration winners from each of them during a command arbitration cycle.

A final arbitration stage 560 selects between the sub-arbitration winners to provide a final arbitration winner for each of PC0 and PC1. Final arbitration stage 560 includes a final arbiter 561 (0) for PC0 and a final arbiter 562 (1) for PC1 Final arbiter 561 is connected to register 551 and selects from among the three sub-arbitration winners for PC0 to provide a final arbitration winner in each controller cycle to a downstream port. Likewise, final arbiter 562 is connected to register 552 and selects from among the three sub-arbitration winners for PC1 to provide a final arbitration winner in each controller cycle to a downstream port. As before, for each final arbiter, the different types of accesses from the sub-arbitration winners can be advantageously mixed so that, for example, a page hit access can be followed by a page miss access or a page conflict access to hide or partially hide the overhead of opening a new page or closing an open page and opening a new page, respectively.

A register stage 570 stores the final arbitration winner for each pseudo channel, and includes a register 571 connected to the downstream port of final arbiter 561, and a register 572 connected to the output of final arbiter 562. In some implementations, two final arbitration winners, one from each of PC0 and PC1, can be selected during each memory controller cycle.

A dispatch queue 580 (BEQ) interleaves the accesses from the two pseudo channels into a single command and address stream with accompanying data (for a write cycle) or while receiving data (for a write cycle) as described with respect to FIG. 3 above.

A DFI Interface is used to communicate signals between memory controller 141 and physical interface circuit 142.

Physical interface circuit 142 communicates with MRDIMM 151 over a memory bus that operates at very high speed and bandwidth, and it can perform four 32-bit in the same amount of time that the DFI bus performs one 128-bit transfer of data.

The virtual controller mode implemented by data processing system 500 is similar to the virtual controller mode implemented by data processing system 400 but data processing system 500 is implemented using a memory controller that shares more memory controller circuit blocks than data processing system 400 of FIG. 4. Notably, data processing system 500 combines all memory accesses directed to both pseudo channels into a single command queue 521. In some implementations, the single command queue may be smaller than the combined size of command queues 421 and 422 of FIG. 4 to reduce circuit area, but may contain more entries than either command queue 421 or command queue 422 alone. Also, page conflict sub-arbiter 543 is shared between PC0 and PC1 This sharing would be advantageous, for example, if the memory controller implemented a robust page close prediction mechanism such that it rarely encountered page conflicts.

Memory controller 141 of FIG. 5 has more common circuit blocks but lower performance, whereas memory controller 141 of FIG. 4 has fewer common circuit blocks but higher performance. The sizes of the DCQs can also vary between the two implementations. For example, DCQ0 and DCQ1 in memory controller 141 of FIG. 4 together may have more entries than the combined DCQ in memory controller 141 of FIG. 5. This difference helps prevent stalling and reduces the number of "bubbles" in the memory data bus when the workloads for PC0 and PC1 are imbalanced such that one pseudo channel runs out of accesses while the other pseudo channel has continuous work.

Thus, a memory controller, data processor, data processing system, and method have been described that implements a virtual controller mode, known as MR-VCM, for use with MRDIMM and similar types of memory. The virtual controller mode allows the sharing of memory controller circuits between the two pseudo channels, while appearing to the system as if there were two independent channels. The MR-VCM feature allows the use of a single memory controller channel to implement two multiplexed-rank channels on the DIMM.

Figure 6:
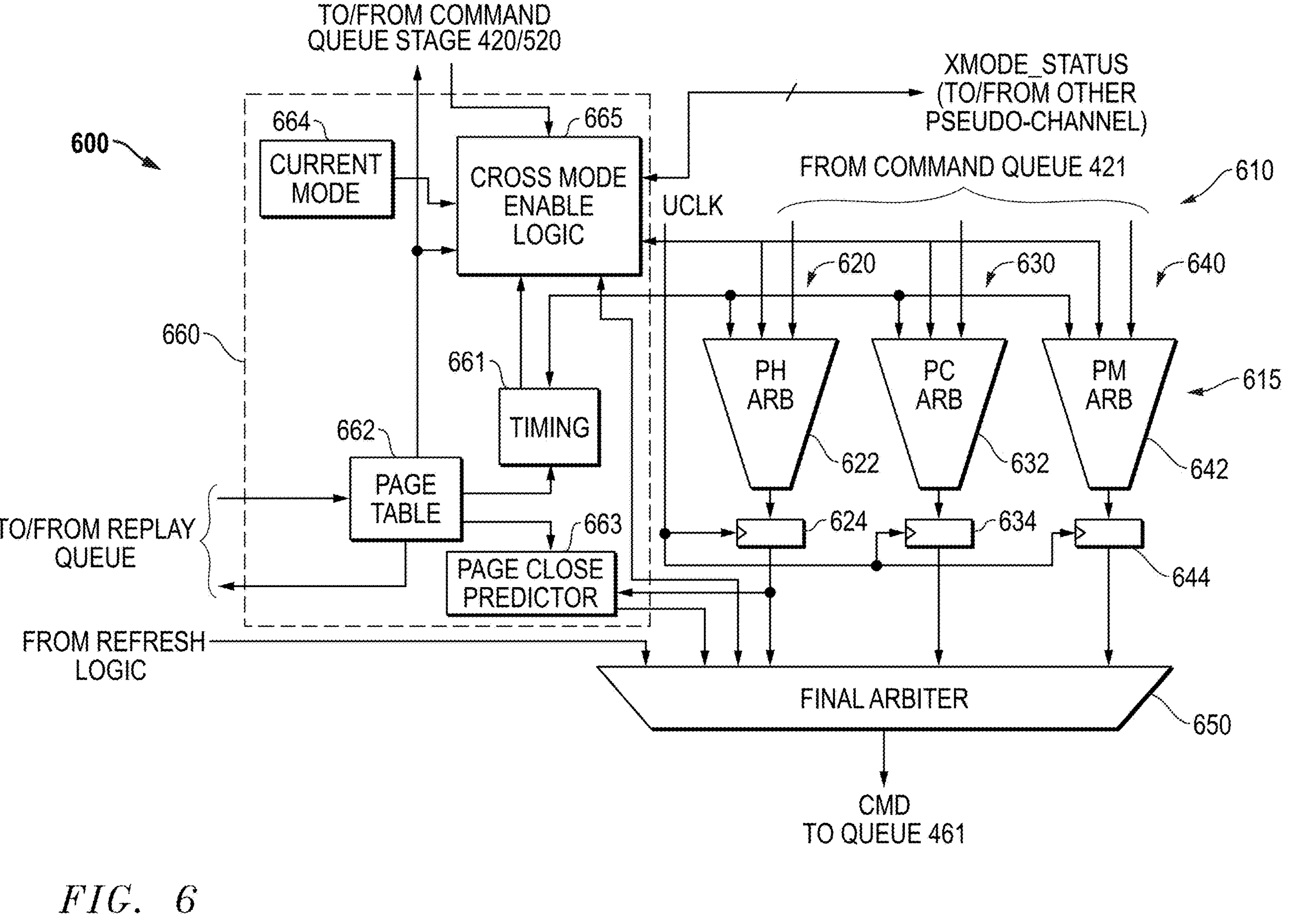
FIG. 6 illustrates a block diagram of an arbitration circuit that can be used with the memory controllers of FIGS. 4 and 5 according to some implementations.

FIG. 6 illustrates a block diagram of an arbitration circuit 600 that can be used with the memory controllers of FIGS. 4 and 5 according to some implementations. Arbitration circuit 600 includes an arbiter core 610 and a set of control circuits 660 associated with the operation of arbiter core 610. Arbiter core 610 includes a set of sub-arbiters 615 and a final arbiter 650. Sub-arbiters 615 include a sub-arbiter 620, a sub-arbiter 630, and a sub-arbiter 640. Sub-arbiter 620 includes a page hit arbiter 622 labeled "PH ARB", and an output register 624. Page hit arbiter 622 has a first input connected to command queue 421, a second input, a bidirectional terminal, and an output. Register 624 has a data input connected to the output of page hit arbiter 622, a clock input for receiving a memory controller clock signal known as the "UCLK" signal, and an output. Sub-arbiter 630 includes a page conflict arbiter 632 labeled "PC ARB", and an output register 634. Page conflict arbiter 632 has a first input connected to command queue 421, a second input, a bidirectional terminal, and an output. Register 634 has a data input connected to the output of page conflict arbiter 632, a clock input for receiving the UCLK signal, and an output. Sub-arbiter 640 includes a page miss arbiter 642 labeled "PM ARB", and an output register 644. Page miss arbiter 642 has a first input connected to command queue 421, a second input, a bidirectional terminal, and an output. Register 644 has a data input connected to the output of page miss arbiter 642, a clock input for receiving the UCLK signal, and an output. Final arbiter 650 has a first input connected to the output of a refresh control logic circuit, not shown in FIG. 6, a second input, a third input connected to the output of output register 624, a fourth input connected to the output of output register 634, a fifth input connected to the output of output register 644, a bidirectional terminal, and an output for providing an arbitration winner to dispatch queue 480 labeled "CMD".

Control circuits 660 include timing block 661, a page table 662, and a page close predictor 663, a current mode register 664, and a cross mode enable logic circuit 665. Timing block 661 has an input, an output, and a bidirectional terminal connected to the bidirectional terminals of page hit arbiter 622, page conflict arbiter 632, and page miss arbiter 642. Page table 662 has an input connected to an output of a replay queue (not shown in FIG. 6), a first output connected to an input of the replay queue, a second output connected to command queue 421, a third output connected to the input of timing block 661, and a fourth output. Page close predictor 663 has a first input connected to one output of page table 662, a second input connected to the output of output register 624, and an output connected to the second input of final arbiter 650. Cross mode enable logic circuit 665 has a first input connected to the output of current mode register 664, a second input connected to command queue stage 420, a bidirectional terminal connected to a corresponding cross mode enable logic circuit of the other pseudo channel, bidirectional terminals connected to page hit arbiter 622, page conflict arbiter 632, and page miss arbiter 642, and a bidirectional terminal connected to the bidirectional terminal of final arbiter 650.

In operation, arbiter core 610 selects memory access commands from command queue 421 and the refresh logic circuit by taking into account the current mode (indicating whether a read streak or write streak is in progress, in which a read streak is a series of read commands without an intervening write command, and a write streak is a series of write commands without an intervening read command), the page status of each entry, the priority of each memory access request, and the dependencies between requests. The priority is related to the quality of service or QoS of requests received from interconnect 132 and stored in command queue 421, but can be altered based on the type of memory access and the dynamic operation of arbiter core 610. Arbiter core 610 includes three sub-arbiters that operate in parallel to address the mismatch between the processing and transmission limits of existing integrated circuit technology. The winners of the respective sub-arbitrations are presented to final arbiter 650. Final arbiter 650 selects between these three sub-arbitration winners as well as a refresh operation from the refresh control logic circuit, and may further modify a read or write command into a read or write with auto-precharge command as determined by page close predictor 663.

Each of page hit arbiter 622, page conflict arbiter 632, and page miss arbiter 642 has an input connected to the output of timing block 661 to determine timing eligibility of commands in command queue 421 that fall into these respective categories. Timing block 661 includes an array of binary counters that count durations related to the particular operations for each bank in each rank. The number of timers needed to determine the status depends on the timing parameter, the number of banks for the given memory type, and the number of ranks supported by the system on a given memory channel. The number of timing parameters that are implemented in turn depends on the type of memory implemented in the system. For example, GDDR5 memories require more timers to comply with more timing parameters than other DDRx memory types. By including an array of generic timers implemented as binary counters, timing block 661 can be scaled and reused for different memory types. The inputs from cross mode enable logic circuit 665 signal the sub-arbiters which type of commands, read, or write, to provide as candidates for final arbiter 650.

Cross mode enable logic circuit 665 operates to cause arbiter core 610 to select only read commands during streaks of read commands over the MRDIMM bus, and only write commands during streaks of write commands over the MRDIMM bus, in order to reduce the overhead from switching from the current mode to the cross mode. Cross mode enable logic circuit 665 makes decisions to switch from a current mode to the cross mode in response to one or more cross mode conditions. For example, cross mode enable logic circuit 665 would decide to switch from picking reads to picking writes when there are no more reads left in command queue stage 420. It may also switch from picking reads to picking writes when a write with the highest Qos indicator is received and there are no reads with the highest QoS indicator. Cross mode enable logic circuit 665 can also detect a cross mode condition requiring a switch to the cross mode based on multiple factors, such as having less than a first watermark of current mode accesses along with more than a second watermark of cross mode accesses.

Cross mode enable logic circuit 665 has been enhanced from known cross mode enable logic circuits, however, by considering the pseudo-channel architecture of MRDIMMs, in which two mostly independent pseudo channels time-multiplex their data over a very high speed interface. Because of the time multiplexing, both data channels must operate in the same mode, read or write, at the same time to avoid contention on the bus, in which contention would occur if one PHY channel drives data in write mode while the memory is also driving data at the same time on the same signal lines in read mode.

In a first particular implementation, cross mode enable logic circuit 665 detects the cross mode condition based on a total number of the second type of commands for the first pseudo channel and the second pseudo channel in command queue stage 420 or command queue stage 520. It can be further based on other factors, such as there being no more current-mode commands in the command queue stage, receiving a cross mode command having the highest QoS indicator, and so on as outlined above. However, in this implementation, the cross mode enable logic circuit for each pseudo channel makes a cross mode decision based on observing all accesses in the command queue stage for both pseudo channels. This implementation provides modularity and avoids substantial re-design by only scaling the number of inputs from the command queue stage to the cross mode enable logic circuit to include all commands for both pseudo channels, and optionally receiving a handshake XMODE_STATUS signal from the other pseudo channel to ensure proper synchronization of the cross mode switching. Cross mode enable logic circuit 665 can be implemented with either a command queue architecture having separate perpseudo-channel command queues as in data processing system 400 of FIG. 4, or a command queue architecture having a combined command queue as in data processing system 500 of FIG. 5. In addition to providing modularity and allowing re-use of existing cross mode logic circuits, another advantage of this implementation is that it does not need to make any assumption about the type of commands being generated for the two pseudo channels, since the cross mode enable logic circuits each make the same cross mode decision based on the overall workload for both pseudo channels.

In a second particular implementation, cross mode enable logic circuit 665 detects the cross mode condition based only on its own respective workload and an indication that the other pseudo channel is ready to switch to the cross mode. This implementation leverages an assumption that the ratio of reads to writes in heavily loaded systems would generally be about the same for each pseudo channel. To the extent that this assumption holds, then each of the two pseudo channels will be ready to switch to the cross mode at approximately the same time, and any inefficiency in data bus usage because of minor imbalances in workloads would be small. If this assumption generally holds, then cross mode enable logic circuit 665 in each pseudo channel can be smaller since it would only need to evaluate a smaller number of command queue entries. According to the disclose implementations, cross mode enable logic circuit 665 makes the determination to switch to the cross mode in response to both it, and its corresponding cross mode enable logic circuit for the other pseudo channel, independently reporting that they are ready to switch to the cross mode.

To accomplish this handshaking, cross mode enable logic circuit 665 has an extra bidirectional terminal for providing a cross mode status signal labelled "XMODE_STATUS" to the cross mode logic circuit for the other pseudo channel, and for receiving a corresponding cross mode status signal from the other pseudo channel. By making this assumption, existing cross mode enable logic circuits can use a simple peer-to-peer protocol, and can be easily adapted from cross mode enable logic circuits that were developed for non-MRDIMM systems with the addition of only a small amount handshake logic circuitry.

The assumption of balanced workloads can be relaxed while using the same minimally modified cross mode enable logic circuits such as cross mode enable logic circuit 665 by making another modification to the memory controller that may already be used. This additional implementation will now be described.

Figure 7:
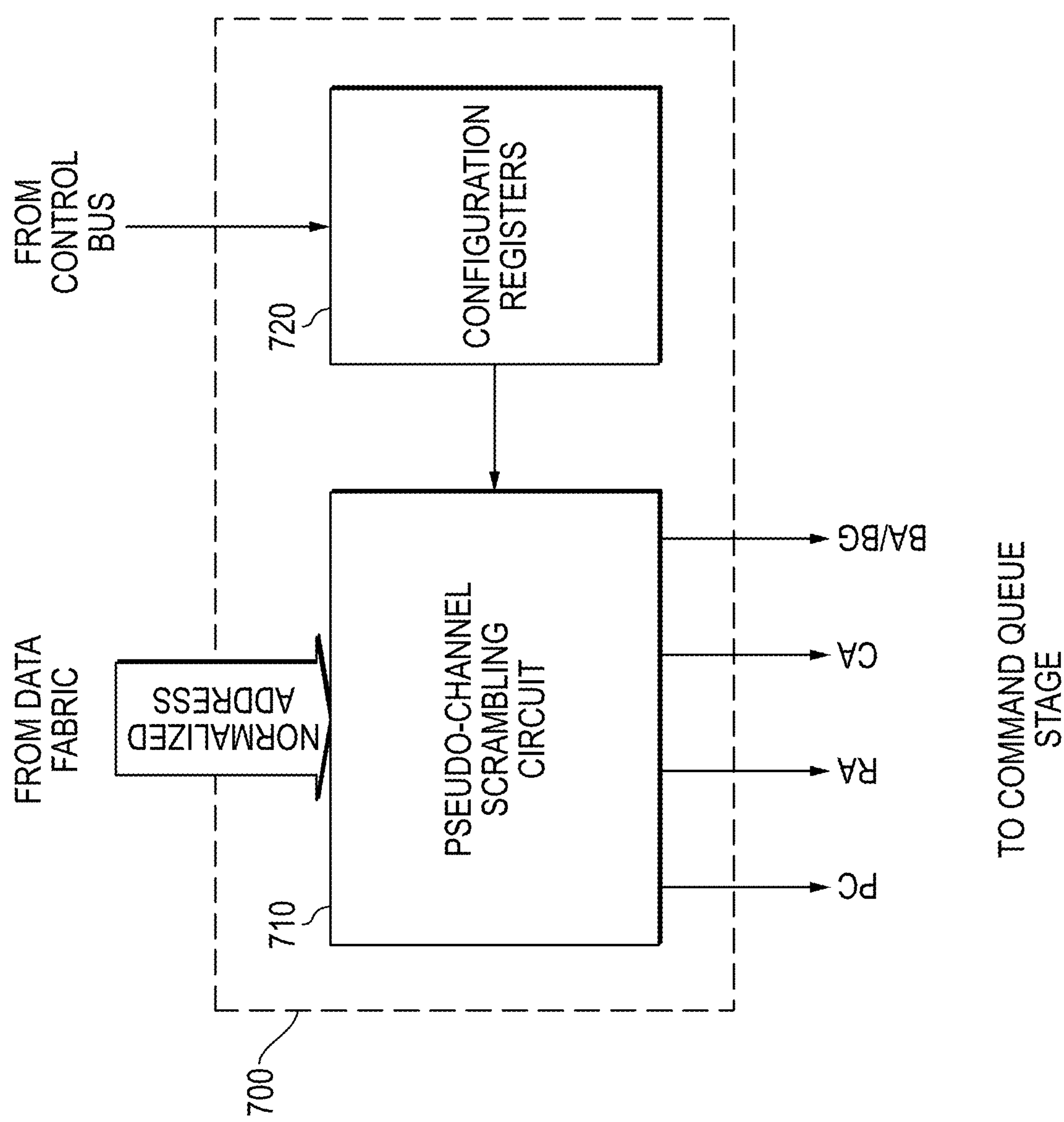
FIG. 7 illustrates a block diagram of another portion of a memory controller that can be used with the memory controllers of FIGS. 4 and 5 according to some implementations.

FIG. 7 illustrates a block diagram of an address decoder 700 that can be used in the memory controllers of FIGS. 4 and 5 according to some implementations. Address decoder 700 is a circuit that includes a pseudo-channel scrambling circuit 710 and a set of configuration registers 720. Pseudo-channel scrambling circuit 710 has an input for receiving a normalized address from data fabric 130, a control input, a first output for providing a pseudo-channel number labelled "PC", a second output for providing a row address labelled "RA", a third output for providing a column address labelled "CA", and a fourth output for providing a bank address labelled "BA" and a bank group number labelled "BG". Configuration registers 720 have an input connected to an internal control bus, and an output connected to the control input of pseudo-channel scrambling circuit 710.

Pseudo-channel scrambling circuit 710 is an address decoder that maps the normalized address received from data fabric 130 into various decoded fields. Thus, it maps each normalized address into a combination of the decoded signals PC, RA, CA, BA, and BG. Instead of breaking up the normalized address space into large regions that may contain data structures that are operated on by a process or thread running on a CPU core complex, it distributes the normalized addresses across the memory address space based on one or more address bits of the normalized address. In particular, it may perform the pseudo-channel scrambling based not on the most significant address bit or bits, but on one or more less significant address bits. This scrambling operation forces these operations to distribute evenly across the pseudo channels. Some existing address decoders may already perform address scrambling across banks to reduce intra-bank conflicts. In these cases, pseudo-channel scrambling circuit 710 may just adjust the scrambling algorithms to ensure that the accesses distribute across the pseudo channels more evenly. To assist that process, address decoder 700 includes configuration registers that may be programmed specifically to cause even spreading for the particular application environment. In this way, even when accessing a large data structure, the pseudo channels receive more equal traffic and thereby improve the utilization of the time-division-multiplexed MRDIMM data bus.

Figure 8:
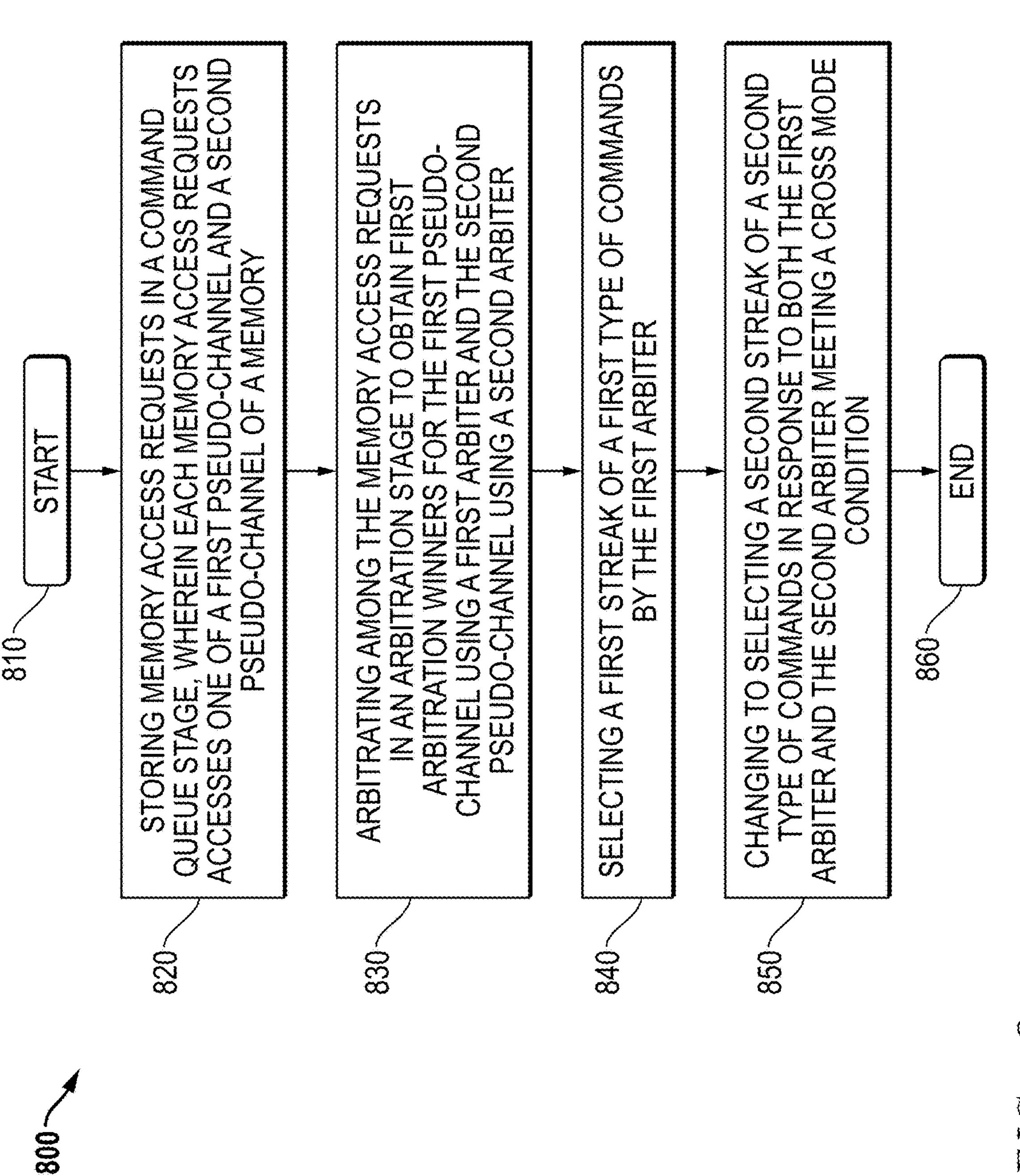
FIG. 8 illustrates a flow chart of a process that can be used for MRDIMM streak management according to some implementations.

FIG. 8 illustrates a flow chart of a process 800 that can be used for MRDIMM streak management according to some implementations. Process 800 starts in a box 810. An action box 820 includes storing memory access requests in a command queue stage, wherein each memory access request accesses one of a first pseudo channel and a second pseudo channel of the memory. An action box 830 includes arbitrating among the memory access requests in an arbitration stage to obtain first arbitration winners for the first pseudo channel using a first arbiter and the second pseudo channel using a second arbiter. An action box 840 includes selecting a first streak of a first type of commands by the first arbiter. An action box 850 includes changing to selecting a second streak of a second type of commands in response to both the first arbiter and the second arbiter meeting a cross mode condition. Process 800 ends at box 860.

Thus, a memory controller, data processing system using the memory controller, and a method for accessing MRDIMMs and other similar memory types have been described. The memory controller controls two MRDIMM pseudo channels in which the data is time division multiplexed between the pseudo channels on a common data bus. Arbiters in the memory controller pick commands mostly independently of one another for each pseudo channel, except that they pick memory access requests of the same type at the same time, read, or write, in their respective pseudo channels. Arbiters for each of the two pseudo channels coordinate to perform streaks of read or write cycles such that they only change from the current mode to the cross mode when the arbiter determines that it should switch to the cross mode based on accesses in its own command queue, and the other pseudo channel's arbiter also indicates it is ready to switch to the cross mode. By assuming that the ratio of read access requests to write access requests will be approximately the same for both pseudo channels, the memory controller does not need to be re-designed or significantly modified but can use existing cross mode logic circuits with only minor modifications.

In other implementations, the techniques described herein can be used for other types of communication systems in which independent streams of data are multiplexed on a common data bus besides a memory bus. For example, the techniques can be used in telecommunications switches, routers, gateways, various data fabrics and interconnects, and the like. In these types of systems, for example, a communications controller can include a command queue stage for storing data transfer requests, and a first arbiter operable to select first transfer requests for a first pseudo channel from the command queue stage, and a second arbiter operable to select second transfer requests for a second pseudo channel from the command queue stage, wherein each of the first arbiter and the second arbiter is operable to select a first streak of a first type of accesses, and to change to selecting a second streak of a second type of accesses in response to the first arbiter and the second arbiter meeting a cross mode condition. Moreover, the communications controller can include a dispatch queue having first and second upstream ports coupled to the first arbiter and the second arbiter, respectively, and a downstream port for conducting first data from the first arbiter that is time-multiplexed with second data from the second arbiter. Moreover, the same additional features described herein in the context of a memory bus can be applied to these other types of communication systems.

While particular implementations have been described, various modifications of these implementations will be apparent to those skilled in the art. For example, the memory controller is useful for MRDIMMs as well as other similar memory types that access pseudo channels that use a time-division duplex data bus to support two channels or pseudo channels. The cross mode condition can be met for the two pseudo channels in various ways to preserve modularity. For example, the cross mode condition can be based on a total number of cross mode commands for both the first pseudo channel and the second pseudo channel in the command queue stage. In another example, the cross mode condition can be based on a total number of the cross mode commands for a respective pseudo channel and the other arbiter indicating that it is ready to switch to selecting the second streak of the second type of commands. For this example, a simple cross mode handshaking can be used independently of or with address scrambling, in which the address scrambling tends to distribute the memory addresses across the pseudo channels more evenly. In some implementations, the scrambling can be varied through a set of user-programmable registers. As described, the two command types were read commands and write commands, but in other embodiments, the disclosed techniques may be applied to other command types forming the current mode and the cross mode.

Accordingly, it is intended by the appended claims to cover all modifications of the disclosed implementations that fall within the scope of the disclosed implementations.

What is claimed is:

1. A memory controller, comprising:
- a command queue stage for storing decoded memory access requests;
- a first arbiter operable to select first decoded memory access requests for a first pseudo channel from the command queue stage; and
- a second arbiter operable to select second decoded memory access requests for a second pseudo channel from the command queue stage,
- wherein the memory controller causes data of the first pseudo channel and the second pseudo channel to be time multiplexed over a memory bus,
- wherein each of the first arbiter and the second arbiter is operable to select a first streak of a first type of accesses, and to change to selecting a second streak of a second type of accesses in response to the first arbiter and the second arbiter meeting a cross mode condition.

2. The memory controller of claim 1, wherein:
- the first type of accesses comprises one of read accesses and write accesses; and
- the second type of accesses comprises another one of the read accesses and the write accesses.

3. The memory controller of claim 1, wherein:
- the cross mode condition is based on a total number of the second type of accesses for both the first pseudo channel and the second pseudo channel in the command queue stage.

4. The memory controller of claim 3, wherein:
- the cross mode condition is further based on a history of the first type of accesses selected for both the first pseudo channel and the second pseudo channel in the command queue stage.

5. The memory controller of claim 1, wherein:
- the cross mode condition is based on a total number of the second type of accesses for a respective pseudo channel in the command queue stage and another one of the first arbiter and the second arbiter indicating that it is ready to switch to selecting the second streak of the second type of accesses.

6. The memory controller of claim 5 further comprising:
- an address decoder having an upstream port for receiving memory access requests, and a downstream port coupled to the command queue stage for providing the decoded memory access requests according to a pseudo-channel number,
- wherein the address decoder further scrambles memory accesses between the first pseudo channel and the second pseudo channel based on one or more address bits of a normalized address.

7. The memory controller of claim 1, further comprising:
- a dispatch queue having first and second upstream ports coupled to the first arbiter and the second arbiter, respectively, and a downstream port for conducting first data from the first arbiter that is time-multiplexed with second data from the second arbiter.

8. A data processing system, comprising:
- a plurality of data processor cores each of which is operable to generate memory access requests;
- a memory having a first pseudo channel and a second pseudo channel; and
- a memory controller operable to receive the memory access requests from the plurality of data processor cores and provide memory commands to the memory, wherein the memory controller causes data of the first pseudo channel and the second pseudo channel to be time multiplexed over a memory bus,
- wherein the memory controller includes a first arbiter and a second arbiter each operable to select a first streak of a first type of accesses, and to change to selecting a second streak of a second type of accesses in response to the first arbiter and the second arbiter meeting a cross mode condition.

9. The data processing system of claim 8, wherein:
- the first type of accesses comprises one of read accesses and write accesses; and
- the second type of accesses comprises another one of the read accesses and the write accesses.

10. The data processing system of claim 8, wherein:
- the cross mode condition is based on a total number of the second type of accesses for both the first pseudo channel and the second pseudo channel in a command queue stage.

11. The data processing system of claim 10, wherein: the cross mode condition is further based on a history of the first type of accesses selected for both the first pseudo channel and the second pseudo channel in the command queue stage.

12. The data processing system of claim 8, wherein: the memory controller further includes a command queue stage; and the cross mode condition is based on a total number of the second type of accesses for a respective pseudo channel in the command queue stage and another one of the first arbiter and the second arbiter indicating that it is ready to switch to selecting the second streak of the second type of accesses.

13. The data processing system of claim 11, wherein the memory controller further comprises:

an address decoder having an upstream port for receiving memory access requests, and a downstream port coupled to the command queue stage for providing decoded memory access requests according to a pseudo-channel number, wherein the address decoder further scrambles memory accesses between the first pseudo channel and the second pseudo channel based on one or more address bits of a normalized address.

14. The data processing system of claim 11, further comprising:

a dispatch queue having first and second upstream ports coupled to the first arbiter and the second arbiter, respectively, and a downstream port for conducting first data of the first arbiter that is time-multiplexed with second data of the second arbiter; and a physical interface circuit coupled to an output of the dispatch queue and to the memory, wherein the memory comprises a multiplexed-rank dual inline memory module (MRDIMM).

15. A method for accessing a memory, comprising:

storing memory access requests in a command queue stage, wherein each memory access request accesses one of a first pseudo channel and a second pseudo channel of the memory;

arbitrating among the memory access requests in an arbitration stage to obtain first arbitration winners for the first pseudo channel using a first arbiter and the second pseudo channel using a second arbiter;

selecting a first streak of a first type of accesses by the first arbiter;

causing data of the first pseudo channel and the second pseudo channel to be time multiplexed over a memory bus; and changing to selecting a second streak of a second type of accesses in response to the first arbiter and the second arbiter meeting a cross mode condition.

16. The method of claim 15, wherein:

selecting the first streak of the first type of accesses by the first arbiter comprises the first streak of one of read accesses and write accesses; and changing to selecting the second streak of the second type of accesses comprises changing to another one of the read accesses and the write accesses.

17. The method of claim 15, wherein:

meeting the cross mode condition comprises meeting the cross mode condition based on a total number of the second type of accesses for both the first pseudo channel and the second pseudo channel in the command queue stage.

18. The method of claim 17, wherein:

meeting the cross mode condition further comprises meeting the cross mode condition based on a history of the first type of accesses selected for both the first pseudo channel and the second pseudo channel in the command queue stage.

19. The method of claim 15, wherein:

meeting the cross mode condition comprises meeting the cross mode condition based on a total number of the second type of accesses for a respective pseudo channel in the command queue stage and another one of the first arbiter and the second arbiter indicating that it is ready to switch to selecting the second streak of the second type of accesses.

20. The method of claim 15, further comprising:

receiving memory access requests;

decoding an address of the memory access requests to form decoded memory access requests, the decoding comprising scrambling the memory access requests between the first pseudo channel and the second pseudo channel based on one or more address bits of a normalized address; and providing the decoded memory access requests to the command queue stage according to a pseudo-channel number.

* * * * *